(12) United States Patent
Uhlendorf et al.

(10) Patent No.: US 7,177,709 B2
(45) Date of Patent: Feb. 13, 2007

(54) CONTROLLER FOR UNDERGROUND MINING

(75) Inventors: Ferdinand Uhlendorf, Dortmund (DE); Wilfried Weigel, Werne (DE); Johannes Wesselmann, Dortmund (DE); Jens Titschert, Lunen (DE); Jürgen Tschöpe, Selm (DE)

(73) Assignee: DBT GmbH, Lunen (DE)

( * ) Notice: Subject to any disclaimer, the term of this patent is extended or adjusted under 35 U.S.C. 154(b) by 314 days.

(21) Appl. No.: 10/840,825

(22) Filed: May 7, 2004

(65) Prior Publication Data

US 2004/0254651 A1    Dec. 16, 2004

(30) Foreign Application Priority Data

May 9, 2003 (DE) .......................... 203 07 308 U

(51) Int. Cl.
*F01B 25/26* (2006.01)
*G05B 11/01* (2006.01)
*G05B 13/00* (2006.01)
*G05B 15/00* (2006.01)
*G05B 21/00* (2006.01)
*G01M 1/38* (2006.01)

(52) U.S. Cl. .............................. 700/20; 700/82; 700/2; 700/9; 700/276; 701/104; 299/1.1; 405/302; 91/1

(58) Field of Classification Search ............... 700/9, 700/2, 20, 82, 276; 701/104; 299/1.1; 405/302; 137/596.15; 91/1
See application file for complete search history.

(56) References Cited

U.S. PATENT DOCUMENTS 4,327,628 A * 5/1982 Weirich et al. ............... 91/522
4,330,154 A * 5/1982 Harris ......................... 299/1.7
4,378,027 A * 3/1983 Weirich et al. .......... 137/596.16
4,379,662 A * 4/1983 Block .......................... 405/302
4,422,807 A * 12/1983 Dettmers et al. ............ 405/296
4,465,408 A * 8/1984 Krieger et al. .............. 405/302
4,473,324 A * 9/1984 Cook .......................... 405/302
4,474,510 A * 10/1984 Bull ............................ 405/296
4,518,285 A * 5/1985 Weber et al. ................ 405/302
4,534,681 A * 8/1985 Weirich et al. .............. 405/294

(Continued)

FOREIGN PATENT DOCUMENTS

GB    2265652    10/1993

OTHER PUBLICATIONS

Whitehorn M. ; Vincent T. ; Debrunner C. ; Steele J. (2001). Stereo Vision in LHD Automation. IEEE.*

*Primary Examiner*—Anthony Knight
*Assistant Examiner*—Sunray Chang
(74) *Attorney, Agent, or Firm*—Fay, Sharpe, Fagan, Minnich & McKee, LLP

(57) ABSTRACT

A controller is disclosed for control operations in underground mining, especially for controllers to control support shields. The controller utilizes a central unit with a microprocessor and assigned, programmable memory devices for the storage and processing of software as well as a connector unit with connectors or circuits for communication between the controller and other controllers and/or actuators, sensors or the like, that are to be controlled with the controller. Both the central unit and the connector unit utilize a modular design. A collection of modules with different performances and/or functionalities are provided for both the central unit and the connector unit to form the hardware of a controller. The modules can be combined with one another and coupled together according to a modular concept.

16 Claims, 2 Drawing Sheets

U.S. PATENT DOCUMENTS

| | | | | |
|---|---|---|---|---|
| 4,552,488 A | * | 11/1985 | Elliott-Moore | 405/299 |
| 4,622,998 A | * | 11/1986 | Kussel et al. | 137/596.15 |
| 4,692,067 A | * | 9/1987 | Ward et al. | 405/302 |
| 4,900,091 A | * | 2/1990 | Neu et al. | 299/1.7 |
| 4,906,143 A | * | 3/1990 | Kussel et al. | 405/302 |
| 4,964,675 A | * | 10/1990 | Welzel | 299/1.7 |
| 5,017,051 A | * | 5/1991 | Kowalik et al. | 405/302 |
| 5,060,556 A | * | 10/1991 | Weirich et al. | 91/527 |
| 5,062,033 A | * | 10/1991 | Kussel et al. | 700/82 |
| 5,073,067 A | * | 12/1991 | Elliott-Moore | 405/302 |
| 5,110,187 A | * | 5/1992 | Heintzmann et al. | 299/1.4 |
| 5,137,336 A | * | 8/1992 | Merten | 299/1.7 |
| 5,234,256 A | * | 8/1993 | Demircan et al. | 299/1.7 |
| 5,401,123 A | * | 3/1995 | Kobow et al. | 405/302 |
| 5,423,638 A | * | 6/1995 | Merriman | 405/292 |
| 6,056,481 A | * | 5/2000 | Watermann et al. | 405/294 |
| 6,361,119 B1 | * | 3/2002 | Kussel | 299/1.1 |
| 6,509,842 B1 | | 1/2003 | Kussel | |
| 6,597,579 B1 | * | 7/2003 | Reszat et al. | 361/731 |
| 6,857,705 B2 | * | 2/2005 | Hainsworth et al. | 299/1.7 |
| 2002/0069011 A1 | * | 6/2002 | Hawkins et al. | 701/104 |
| 2003/0097204 A1 | * | 5/2003 | Coogan | 700/276 |
| 2004/0221713 A1 | * | 11/2004 | Mundry et al. | 91/1 |

* cited by examiner

CONTROLLER FOR UNDERGROUND MINING

FIELD OF THE INVENTION

The present invention relates to a controller for control operations in underground mining. The controller utilizes a modular hardware structure including a central unit with a microprocessor and an assigned programmable memory device for the storage and processing of software and a connector or terminal unit to facilitate communication between the controller and other controllers and/or actuators, sensors and similar devices that are to be controlled.

BACKGROUND OF THE INVENTION

In underground mining, efforts are being made to achieve universal, structurally modular control systems for a variety of applications in order to reduce the costs associated with development, manufacturing, certification and spare parts stockage of the hardware. The main area of application of such control systems is underground electro-hydraulic longwall mining for coal winning systems with ploughs or shearers. Such coal winning systems require a high number of actuators or sensors to be controlled. On a particular underground face, a multitude of identically-equipped controllers can be used in adjacent shield supports. However, on another face the controller may have to meet other requirements since, for example other actuators or sensors may have to be controlled and/or the controller must be able to process other control programs. At the same time, it must be possible to adapt the software implemented in the controller to different hardware platforms and/or control tasks. Since typically, a common controller design is used for each of many applications, one or more of the controllers are often over-sized or not particularly matched to a corresponding application.

Accordingly, there is a need for a controller that may be readily and easily configured for a variety of applications. It would be desirable to provide such a controller that was particularly adapted for use in an underground mining control system. The controller should be readily configurable to control or monitor a number of actuators or sensors, or interface with other control programs. It is further desirable to provide a controller that can readily adapt its software to different hardware platforms or control functions.

SUMMARY OF THE INVENTION

An object of the present invention is to provide controllers for control operations in underground mining that correspond to the previously noted objectives. With regard to the hardware, this object is achieved, according to the invention, in that the central unit and the connector unit each utilize a modular design. A collection of modules with different performances and/or functionality are provided for the central unit and the connector unit. The modules can be combined with one another and coupled together, preferably in any manner and combination, in accordance with a modular concept to form the hardware of a controller. Due to the modular design of entire components of the controllers, namely the component "central unit" and the component "connector unit", controllers can be provided that are specifically tailored to control operations without being over-sized with regard to their performance, capacity or functionality, and hence without being excessively costly. The modules of the central unit and the modules of the connector unit can differ from each other particularly with regard to their performance, current consumption and functionality. In the central unit, processors and environments for processors can be realized that differ with regard to their processor type and hence in their computing performance, current consumption, data bus width and also in the scope, i.e. capacity, and type of their volatile and non-volatile memory devices. In the connector unit, modules can especially differ with regard to the number, type and design of the plug connectors, and in the performance of the interfaces.

The controller of the invention can further include a "switching unit" with input provisions for the manual entry of control commands and/or with display provisions to show data, operating status or functions. The modules of the switching unit can include different input provisions or display provisions. The switching unit modules can be combined and coupled preferably in any manner with the central unit and the connector unit so that the modular concept can also be applied, with the associated cost advantages, in the manufacture of the respective modules and system. The modules forming the switching unit can differ in the quantity and type of their input possibilities (switches, keys, etc.), in the quantity and type of their output elements (LED, displays), and in their power consumption.

Coupling and combination of the individual modules can be ensured via standardized mechanical or electrical interfaces between the modules. It will be understood that in a preferred embodiment all modules are designed so that in each case they can be inserted in a uniform housing with uniform mounting means. It is especially preferred that one or both of the switching unit and the connector unit is provided with an information element in which the integrated hardware components or hardware properties of the unit(s) are stored in such a way that they can be read automatically by the central unit. This automatic reading of the respective information elements (identifying or signature devices) upon activation, i.e. when the controller is booted up, means that all hardware available in the controller is automatically and software-independently recognized by the central unit.

At least one memory device in the central unit preferably comprises a freely-programmable FPGA (Field Programmable Gate Array). With the design of the connector unit being correspondingly adapted, this offers the specific advantage that the FPGA allows the functionality of the connections in the connector unit to be freely configured and thus adaptable by the use of software to a variety of functions. In order to allow the functionality of especially the connector unit to be adapted via the FPGAs to a variety of operation tasks and to allow realization of different interfaces, communication protocols, data handling, digital filters, controllers and the like, it is especially advantageous if at least one flash memory device, hence a writable, non-volatile memory device, is assigned to the FPGA in which the software codes for generation of different functionalities or designs are stored with the FPGA and can be accessed when necessary.

In accordance with the present invention, software to be loaded into the memory device is composed hierarchically, in accordance with a layer or modular concept, of individual drivers, preferably stored in different software libraries. The combination of the modular design of the central unit, the connector unit and/or the switching unit and homologation of the software code stored in assigned libraries of a development environment, means that the modules in one or more of these units can be changed independently of the user while the functionality of the controller is retained. For use in underground mining, it is especially provided that at least the connector units are designed such that they fulfill all explosion-proof requirements for hazardous zones and/or are "intrinsically safe".

BRIEF DESCRIPTION OF THE DRAWINGS

In the following description, the invention will be explained with reference to schematically shown embodiment examples.

DETAILED DESCRIPTION OF THE PREFERRED EMBODIMENTS

Figure 1:
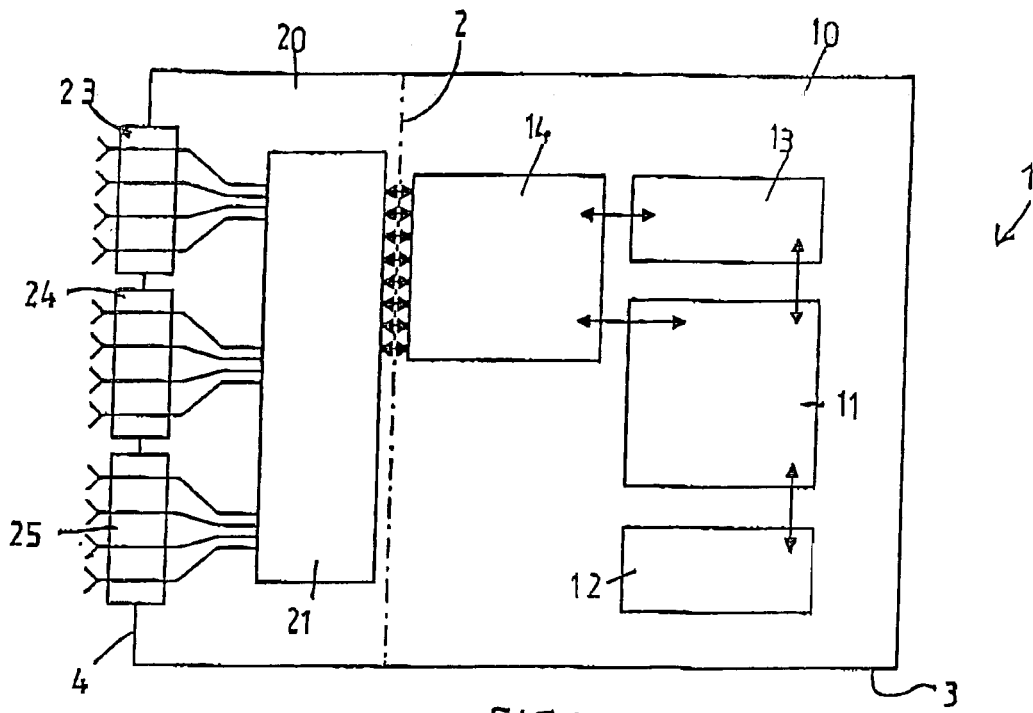
FIG. 1 schematically illustrates a controller according to the invention in a preferred embodiment.

In FIG. 1, reference numeral 1 refers to a programmable, electronic controller for a variety of different control operation tasks in underground mining. The control operations can relate to underground face development with electro-hydraulic face shield supports, conveyor gearing, drum shearer loaders, mobile vehicles as well as sectional cut heading machines or overhead monorail conveyors. The preferred control application is underground support shielding with support shields disposed along the length of the face that are controlled individually via a data bus. The control system can monitor sensors on assigned support shields and operate actuators such as electro-hydraulic valves to extend or retract lifting props on the shield support or to move the shield support in the direction of the working face by extending or retracting a pushing cylinder of the shield support. Electro-hydraulic support shielding in general is well known in the art and will therefore not be described further here.

The controller 1 has a modular design, and includes a first module 10 that comprises or forms the central unit of the controller, and a second module 20 that comprises or forms the connector unit of the controller 1. Both modules 10, 20 are connected together or otherwise placed in communication by the use of standardized electrical and mechanical connections, not shown, at the module interface 2. Both modules 10, 20 are disposed in a housing 3, not shown in greater detail, that is suitably designed for underground mining. The module 10 forming the central unit has, as a central element, a microprocessor 11 and a processor environment for operating the microprocessor. In the central unit module 10, the microprocessor 11 is equipped with a RAM memory device 12, a flash memory device 13 and an FPGA (Field Programmable Gate Array) 14. These devices together with control circuit boards and/or cables constitute the hardware of the module 10. The connector unit module 20 comprises schematically illustrated analogue and digital input/output circuits 21 (I/O circuits) and on the rear side 4 of the housing 3, a collection of connectors 23, 24, 25 optionally with different plug-in connectors, not illustrated in further detail, in order for the controller 1 to receive the signals from the sensors connected, for example to the connector 23, and to be able to transmit control signals to the actuators connected, for example to connector 24. The edge-board connectors 23, 24, 25 are preferably designed to fulfill the explosion-proof regulations for "intrinsically safe" and are multi-functional since the functionality of the connectors 23, 24, 25 can be changed, composed or supplemented in any manner via the circuit 21 and the FPGA 14 assigned to the circuit 21. To this end, suitable software drivers for a design of the FPGA 14 with the function components necessary for the respective control tasks of the controller 1 and the associated drivers are deposited in the flash memory 13, as is explained below. The flash memory device 13 therefore serves to store the design for the FPGA 14 and the drivers for the processor 11, the RAM memory 12 and the circuits 21, inclusive of the associated software code for carrying out different control operations.

Figure 2:
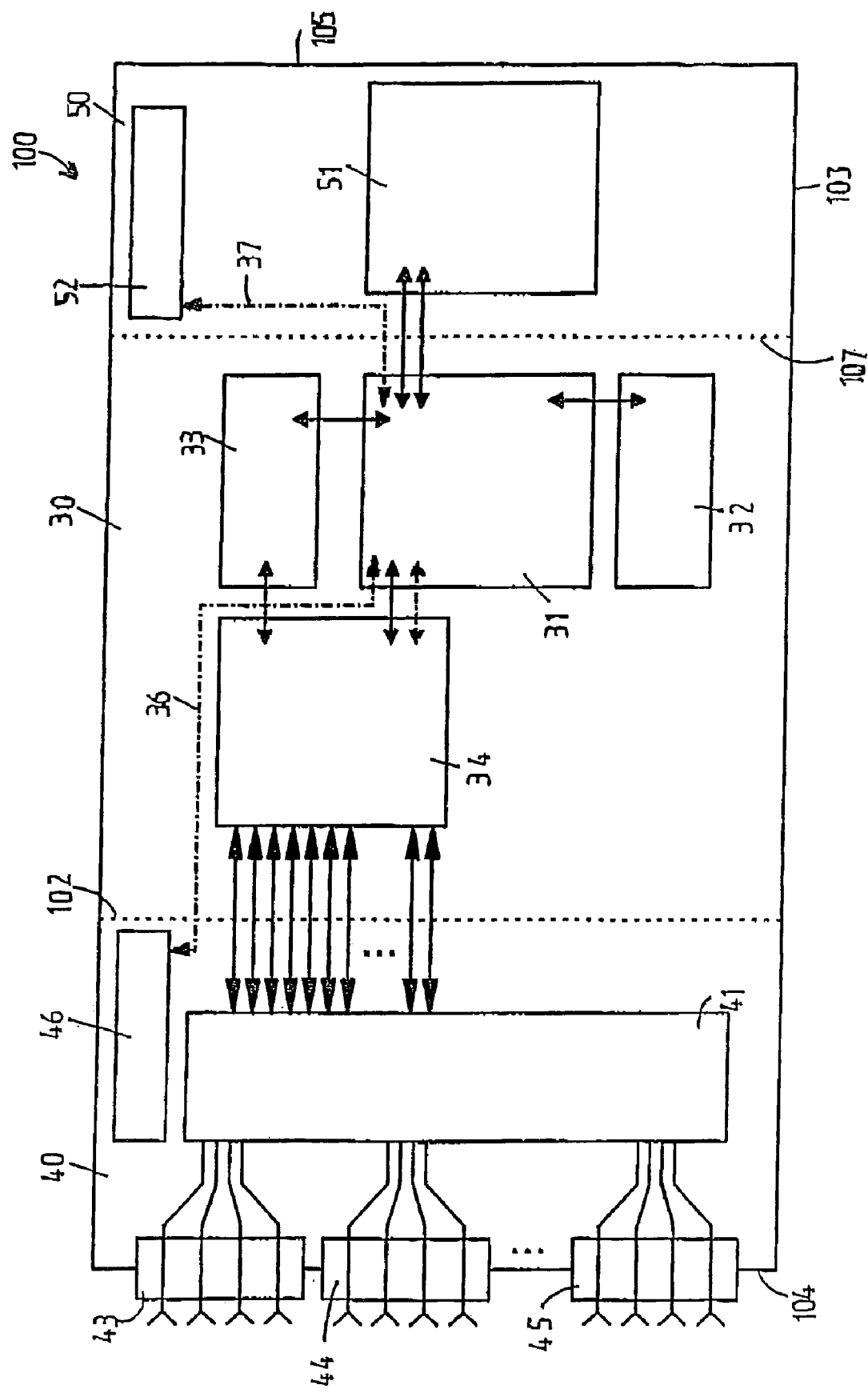
FIG. 2 schematically illustrates another controller according to the invention in another preferred embodiment.

FIG. 2 shows an alternative embodiment of the invention. In FIG. 2, reference numeral 100 refers to a programmable, electronic controller for control operations in underground mining, comprising three modules 30, 40, 50. The module 30 forms the central unit and has, as in the embodiment example according to FIG. 1, a microprocessor with environment 31, a RAM memory device 32, a flash memory device 33 and an FPGA 34. Analogue or digital data exchange is illustrated in FIG. 2 by the use of arrows with dotted lines. The module 40, providing the connector unit again comprises analogue and digital circuits 41, the functionality of which can be multi-functionally set by the design of the FPGA 34, and a plurality of connectors or groups of connectors 43, 44, 45 with suitable plug sockets and the like which are disposed on the rear side 104 of the housing 103. The connector unit 40 also has an information element 46 as an identifier means in which automatically-readable data is stored relating to and identifying the hardware components available in the analogue and digital circuits 41 and at the connectors 43, 44, 45. The information element 46 can be read by the microprocessor 31, as shown by the arrow 36 with the dotted line, so that when the controller 100 is activated the microprocessor 31 and hence the central unit 30 receive information as to the hardware components which are available in the connector unit 40.

The controller 100 comprises a third module 50 for a switching component or switching unit, indicated schematically by the reference numeral 51, that contains suitable displays or display devices and/or keyboards for entry of control commands. The displays and keyboards are accessible or visible on the front side 105 of the controller 100. In the switching unit module 50, an information element 52 is integrated as an identifying or signature component on which is stored, in a readable manner, all information as to which keyboards and display devices 51 are available as hardware in the module 50. In addition, the information element 52 can be automatically read by the microprocessor 31 of the central unit 30 in a suitable manner, as indicated by the dot-dash arrow 37. Both module 40 and module 50 can be coupled with the central unit module 30 at the module interfaces 102, 107 via standardized mechanical and electrical interfaces, such that when in a connected state and after activation of the controller 100, the controller automatically recognises all available hardware components as a result of the information elements 46, 52.

Figure 3:
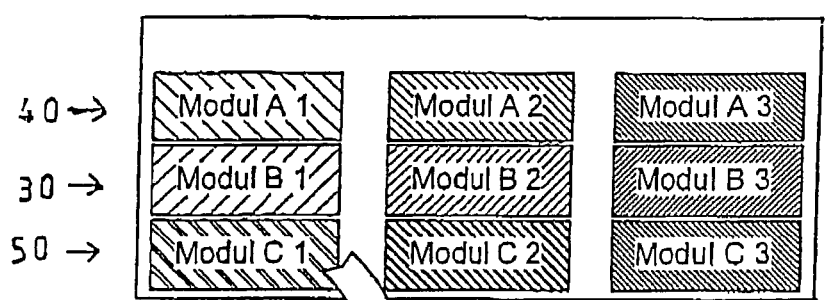
FIG. 3 schematically illustrates the modular concept of the controller according to FIG. 2.
Figure 3:
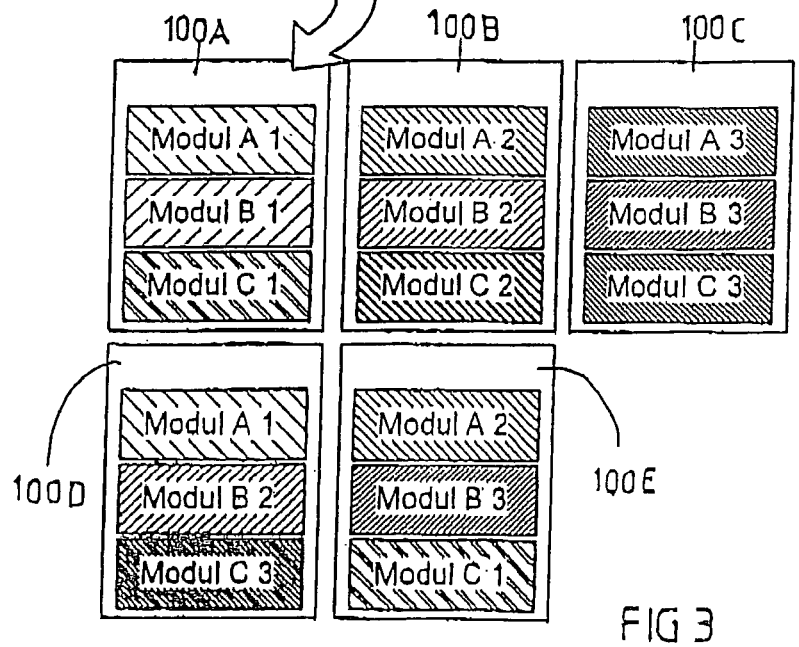

The layout of the controller 100 with three modules 30, 40, 50, connected together via standardized interfaces, offers the specific advantage that controllers can be provided for the different operations in underground mining such that their hardware is substantially and optimally adapted for the control operations without being over-sized or under-sized with regard to energy consumption, power consumption, computing performance, etc. FIG. 3 illustrates how a plurality of different controllers 100A, 100B, 100C, 100D, 100E can be provided in accordance with the modular concept out of in each case three different embodiment variants of modules 30, 40 and 50. In FIG. 3, different embodiment variants for modules 30 are designated as B1, B2, B3, while different embodiment variants for the connector unit modules 40 are designated A1, A2, A3 and different embodiment variants for the switching unit modules 50 are designated as C1, C2, C3. As previously explained, the hardware in variants B1, B2, B3 for module 30 can differ in their processor type and hence in their computing performance, current consumption, data bus width and in the scope and type of their RAM and flash memory devices and in the type and scope of the FPGA. Variants A1, A2, A3 for the module 40 can differ in the quantity, type and design of the connector components and the performance data of the circuits and variants C1, C2, C3 for the module 50 can differ with regard to potential input possibilities, the quantity and type of output elements and power consumption. Specifically, controller 100A includes variant modules A1, B1, and C1. Controller 100B comprises variant module A2, B2, and C2. Controller 100C includes variant modules A3, B3, and C3. Controller 100D includes variant modules A1, B2, and C3. And, controller 100E comprises variant modules A2, B3, and C1.

In order to retain optimum versatility with the modular designed controllers 1 or 100, the associated software is also composed in each case according to a hierarchical layer or modular concept so that the layer model of the software supports the modular exchange of hardware components. The layer model can especially comprise a base library (Base-LIB) for program functions in which all drivers for controlling, accessing and operating the individual hardware components and the function components for the FPGA are contained. In an application-specific library for program functions (API-LIB), only those drivers that are necessary for realization of a control operation are included or initialized, and in the respectively required quantities. This ensures that all drivers for the control-specific operations are available. Communication takes place via a suitable interface to allow access to the program functions available in the API-LIB. Loading of the respective drivers from the different libraries into the flash memory of the central unit takes place in a development environment such that all function components for possible designs of the FPGA can be deposited and combined in a superordinated library (VHDL library) in order to implement different control operations with the modular designed controllers. Then, when programming and initializing the controllers, corresponding FPGA designs that are matched to the control operations to be performed are written into the flash memory device so that optionally, a plurality of FPGA designs for different control operations can also be stored. It is possible to define with the assistance of a batch file or by internal or optionally external coding of the controller, such as for example a coding plug connected to one of the connectors of the connector unit, which control operations will be carried out with the controller.

The modularity of the controllers according to the invention results from the use of a modular concept for the respective modules. Accordingly, the modules can be combined and coupled with each other in any manner. The flexibility regarding the functionality and program functions of the connector unit results from the utilized FPGAs and the layer model of the software. Any of these individual concepts may be an independent inventive idea.

The exemplary embodiments have been described with reference to certain preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

We claim:

1. A plurality of controllers adapted for control operations in underground mining, each controller comprising a central unit module with a microprocessor and assigned, programmable memory devices for the storage and processing of software, and a connector unit module for communication between the controller and other controllers, actuators, or sensors that are to be controlled, wherein at least one of the central unit module and the connector unit module in a controller exhibits technical performances or technical functionalities different from those of a corresponding module in another controller of the plurality of controllers, and wherein these different modules can be combined according to a modular concept to form the hardware of a controller.

2. A plurality of controllers according to claim 1, each controller further comprising a switching unit module including input means for manual entry of control commands or display means for displaying data, operating status or functions, wherein the switching unit module can be combined and coupled together in any manner with the central unit module and the connector unit module.

3. A plurality of controllers according to claim 2 wherein the switching unit module exhibits differences in the quantity or type of inputs, quantity or type of outputs, or power consumption as compared to switching unit modules of another controller in the plurality of controllers.

4. A plurality of controllers according to claim 2 wherein at least one of the switching unit module and the connector unit module include an information element in which the hardware components of the associated unit are stored for automatic reading via the central unit module.

5. A plurality of controllers according to claim 1 wherein the memory devices in the central unit module comprises a freely-programmable FPGA.

6. A plurality of controllers according to claim 5, wherein the connector unit module comprises at least one of connectors and circuits, wherein the functionality of the at least one connectors and the circuits in the connector unit module can be configured via the FPGA.

7. A plurality of controllers according to claim 5 wherein the memory devices in the central unit module further comprises a flash memory device assigned to the FPGA.

8. A plurality of controllers according to claim 5, further including software loaded into the memory devices of the central unit module, wherein the software is composed hierarchically, in accordance with a layer or modular concept, of individual drivers, stored in different software libraries.

9. A plurality of controllers according to claim 8, wherein the software includes base drivers for controlling, accessing or operating the individual hardware components or function components and application specific drivers, the drivers being stored in one library and application-specific drivers are stored in another library.

10. A plurality of controllers according to claim 1 wherein the connector unit module is adapted to fulfill explosion-proof requirements.

11. A plurality of controllers adapted for use with underground mining control systems, each controller comprising:
a connector unit module including provisions for facilitating communication between the controller and other controllers, actuators, or sensors;

a switching unit module including at least one of (i) input provisions for entry of control commands and (ii) display provisions for showing data, operating status, or functions;

a central unit module including a microprocessor and a programmable memory device for storing and processing of software, the central unit module being in communication with the connector unit module and the switching unit module; and wherein at least one of the central unit module, connector unit module, and switching unit module in a controller of the plurality differs in technical performance and technical function as compared to a corresponding module in another controller of the plurality, and wherein these modules can be combined according to a modular concept to form the hardware of a controller.

12. A plurality of controllers in accordance with claim 11 wherein at least one of the switching unit module and the connector unit module further includes an information element in which hardware information is stored, the information element being readable by the central unit module.

13. A plurality of controllers in accordance with claim 12 wherein the central unit module reads the hardware information stored in the information element upon activation of the controller.

14. A plurality of controllers in accordance with claim 11 wherein the memory device of the central unit module is a freely-programmable FPGA.

15. A collection of controllers adapted for use in underground mining operations, the collection including a first controller and a second controller, each of the first and second controller comprising:

a central unit module having a microprocessor and a memory device; and a connector unit module having a plurality of plug connectors and an interface for transmitting signals to and from the central unit module;

wherein the first controller exhibits at least one of (i) the central unit module of the first controller differs from the central unit module of the second controller in regards to at least one technical characteristic selected from the group consisting of computing performance, current consumption, data bus width, capacity of memory device, type of memory device, and combinations thereof; and (ii) the connector unit module of the first controller differs from the connector unit module of the second controller in regards to at least one technical characteristic selected from the group consisting of number of plug connectors, type of plug connectors, design of plug connectors, performance of the interface, and combinations thereof, and wherein these modules can be combined according to a modular concept to form the hardware of a controller.

16. The collection of controllers in accordance with claim 15 wherein each of the first and second controller further comprise:

a switching unit module having at least one of (i) input provisions for entry of control commands, and (ii) display provisions for showing data, operating status or functions;

wherein the switching unit module of the first controller differs from the switching unit module of the second controller in regards to at least one characteristic selected from the group consisting of quantity of input provisions, type of input provisions, quantity of display provisions, type of display provisions, power consumption, and combinations thereof.

* * * * *